US012625627B2

(12) United States Patent
Kanteti

(10) Patent No.: US 12,625,627 B2
(45) Date of Patent: May 12, 2026

(54) FILE SYSTEM STORAGE ALLOCATION BASED ON ZONES OF A MEMORY DEVICE

(71) Applicant: Micron Technology, Inc., Boise, ID (US)

(72) Inventor: Kumar Vkh Kanteti, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/165,730

(22) Filed: Feb. 2, 2021

(65) Prior Publication Data

US 2022/0244869 A1 Aug. 4, 2022

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
USPC ......................................................... 711/154
See application file for complete search history.

(56) References Cited

U.S. PATENT DOCUMENTS

| | | | | | |
|---|---|---|---|---|---|
| 6,473,775 | B1 * | 10/2002 | Kusters | ...................... | G06F 9/50 |
| | | | | | 707/649 |
| 6,701,420 | B1 * | 3/2004 | Hamilton | .............. | G06F 12/023 |
| | | | | | 711/170 |
| 6,898,680 | B2 * | 5/2005 | Chambers | .......... | G11C 16/3454 |
| | | | | | 711/155 |
| 2003/0070034 | A1 * | 4/2003 | Friedman | ............... | G11C 16/22 |
| | | | | | 711/103 |
| 2007/0143563 | A1 * | 6/2007 | Pudipeddi | ............. | G06F 3/0607 |
| | | | | | 711/173 |

(Continued)

FOREIGN PATENT DOCUMENTS

| | | | | |
|---|---|---|---|---|
| CN | 108664218 A | 10/2018 | | |
| CN | 112041805 B | 8/2024 | | |
| WO | WO-2007090857 A1 * | 8/2007 | .......... | G11C 16/102 |

OTHER PUBLICATIONS

"Zoned Namespaces (ZNS) SSDs", https://zonedstorage.io/introduction/zns/, 9 pages.

(Continued)

*Primary Examiner* — Jared I Rutz
*Assistant Examiner* — Elias Young Kim
(74) *Attorney, Agent, or Firm* — Lowenstein Sandler LLP

(57) ABSTRACT

A system and method for performing file system storage allocation using zones of a memory device. An example method involving a host system: receiving zone characteristic data from a memory sub-system that includes a memory device, wherein the memory device includes a plurality of zones and wherein the zone characteristic data comprises one or more locations in the memory device corresponding to the plurality of zones; identifying, by the host system, a write request that comprises file system data for a file system; determining, by the host system, whether the file system data is associated with at least one of the plurality of zones; allocating, by the host system, a storage unit in a zone based on the zone characteristic data; and providing, by the host system, a location of the storage unit to the memory sub-system to store the file system data on the memory device.

20 Claims, 7 Drawing Sheets

(56)                References Cited

U.S. PATENT DOCUMENTS

| | | | | |
|---|---|---|---|---|
| 2009/0049238 | A1* | 2/2009 | Zhang | G06F 16/1724 |
| | | | | 711/E12.001 |
| 2011/0119465 | A1* | 5/2011 | Suzuki | G06F 9/5016 |
| | | | | 711/171 |
| 2011/0145538 | A1* | 6/2011 | Yoshioka | G06F 12/0253 |
| | | | | 711/171 |
| 2011/0153972 | A1* | 6/2011 | LaBerge | G06F 3/0652 |
| | | | | 711/170 |
| 2014/0095772 | A1* | 4/2014 | Lee | G06F 3/061 |
| | | | | 711/103 |
| 2014/0189200 | A1* | 7/2014 | Gavens | G06F 12/10 |
| | | | | 711/103 |
| 2015/0339319 | A1* | 11/2015 | Malina | G06F 3/0643 |
| | | | | 707/737 |
| 2016/0313943 | A1* | 10/2016 | Hashimoto | G06F 16/1847 |
| 2017/0017405 | A1* | 1/2017 | Dubeyko | G06F 12/0246 |
| 2017/0024160 | A1* | 1/2017 | Feldman | G06F 3/064 |
| 2017/0060898 | A1* | 3/2017 | Lu | G06F 3/0689 |
| 2017/0123665 | A1* | 5/2017 | Jannen | G06F 3/0676 |
| 2018/0011786 | A1* | 1/2018 | Kim | G06F 12/0207 |
| 2018/0024737 | A1* | 1/2018 | Dubeyko | G06F 3/064 |
| | | | | 711/102 |
| 2019/0278710 | A1* | 9/2019 | Ehrlich | G06F 3/0676 |
| 2020/0356288 | A1 | 11/2020 | Dronamraju et al. | |
| 2021/0089217 | A1* | 3/2021 | Bjørling | G06F 12/0238 |
| 2021/0223962 | A1* | 7/2021 | Esaka | G06F 3/064 |
| 2021/0406174 | A1* | 12/2021 | Gole | G06F 12/0868 |
| 2022/0075716 | A1* | 3/2022 | Tikoo | G06F 3/064 |
| 2022/0138099 | A1* | 5/2022 | Kang | G06F 12/0246 |
| | | | | 711/154 |
| 2022/0206952 | A1* | 6/2022 | Yuan | G06F 3/067 |

OTHER PUBLICATIONS

Bjørling, Matias, "Zone Append: A New Way of Writing to Zoned Storage", Western Digital, Feb. 23, 2020, https://www.usenix.org/system/files/vault20_slides_bjorling.pdf, 16 pages.

"Zoned Storage Now Encompasses Both HDD & SSD Technologies", Western Digital, White Paper, 12 pages.

"File Systems and Zoned Block Devices", Western Digital, https://zonedstorage.io/linux/fs/, 17 pages.

"ZoneFS—Zone filesystem for Zoned block devices", The Linux Kernel, https://www.kernel.org/doc/html/latest/filesystems/zonefs.html, 1 page.

"Higher Capacities, Lower TCO & Improved QoS", Western Digital, https://www.westerndigital.com/company/innovations/zoned-storage, 13 pages.

"Zonefs File-System Will Land with Linux® 5.6", Western Digital, https://blog.westerndigital.com/zonefs-file-system-linux-5-6/, 7 pages.

"What is Zoned Storage and the Zoned Storage Initiative?", Western Digital, https://blog.westerndigital.com/what-is-zoned-storage-initiative/, 11 pages.

* cited by examiner

500

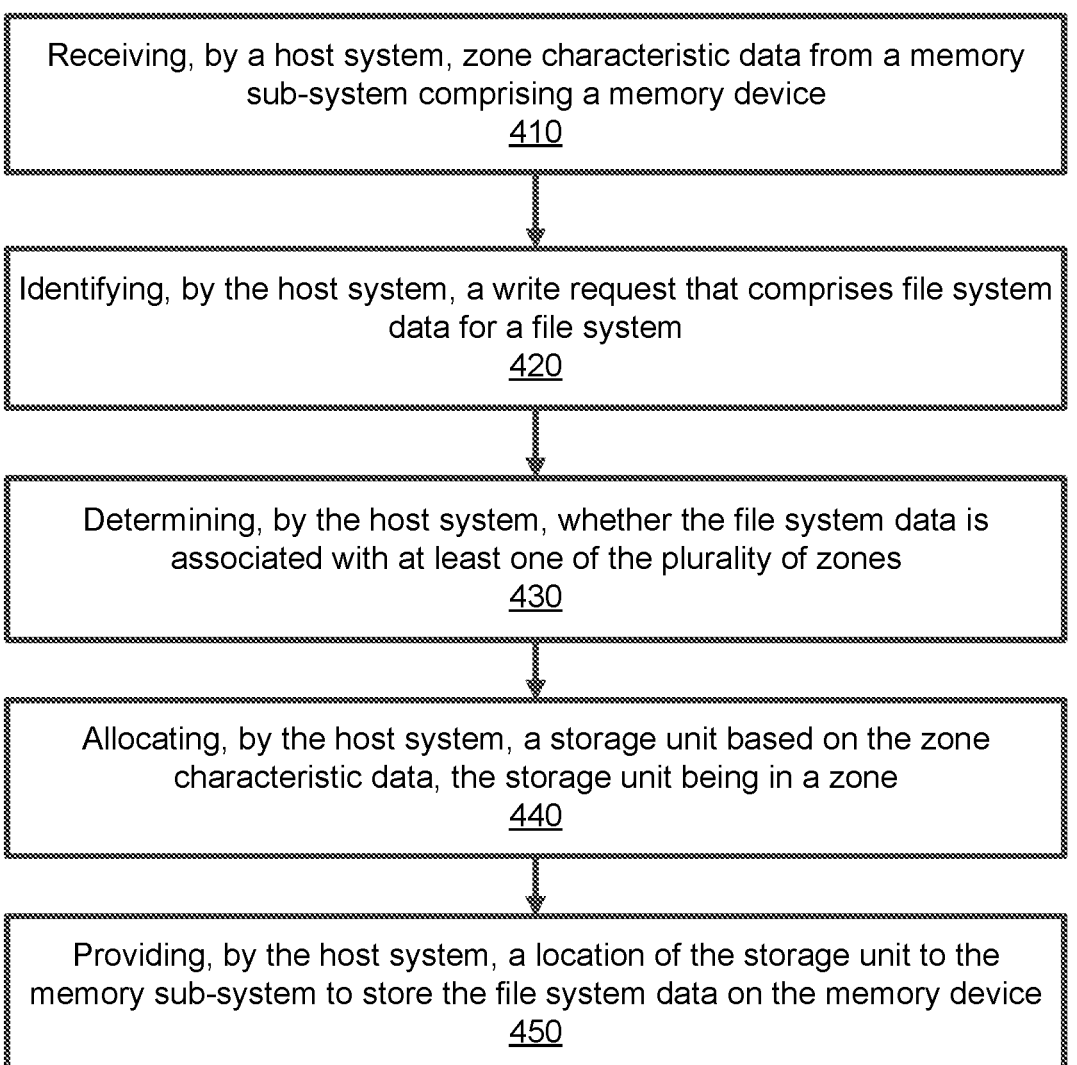

Receiving, by a host system, zone characteristic data from a memory sub-system comprising a memory device
410

Identifying, by the host system, a write request that comprises file system data for a file system
420

Determining, by the host system, whether the file system data is associated with at least one of the plurality of zones
430

Allocating, by the host system, a storage unit based on the zone characteristic data, the storage unit being in a zone
440

Providing, by the host system, a location of the storage unit to the memory sub-system to store the file system data on the memory device
450

FIG. 4

FILE SYSTEM STORAGE ALLOCATION BASED ON ZONES OF A MEMORY DEVICE

TECHNICAL FIELD

Embodiments of the disclosure relate generally to memory sub-systems, and more specifically, relate to file system allocation based on zones of a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow chart of a method for file system storage allocation based on zones of a memory device, in accordance with some embodiments of the present disclosure.

DETAILED DESCRIPTION

Figure 1:
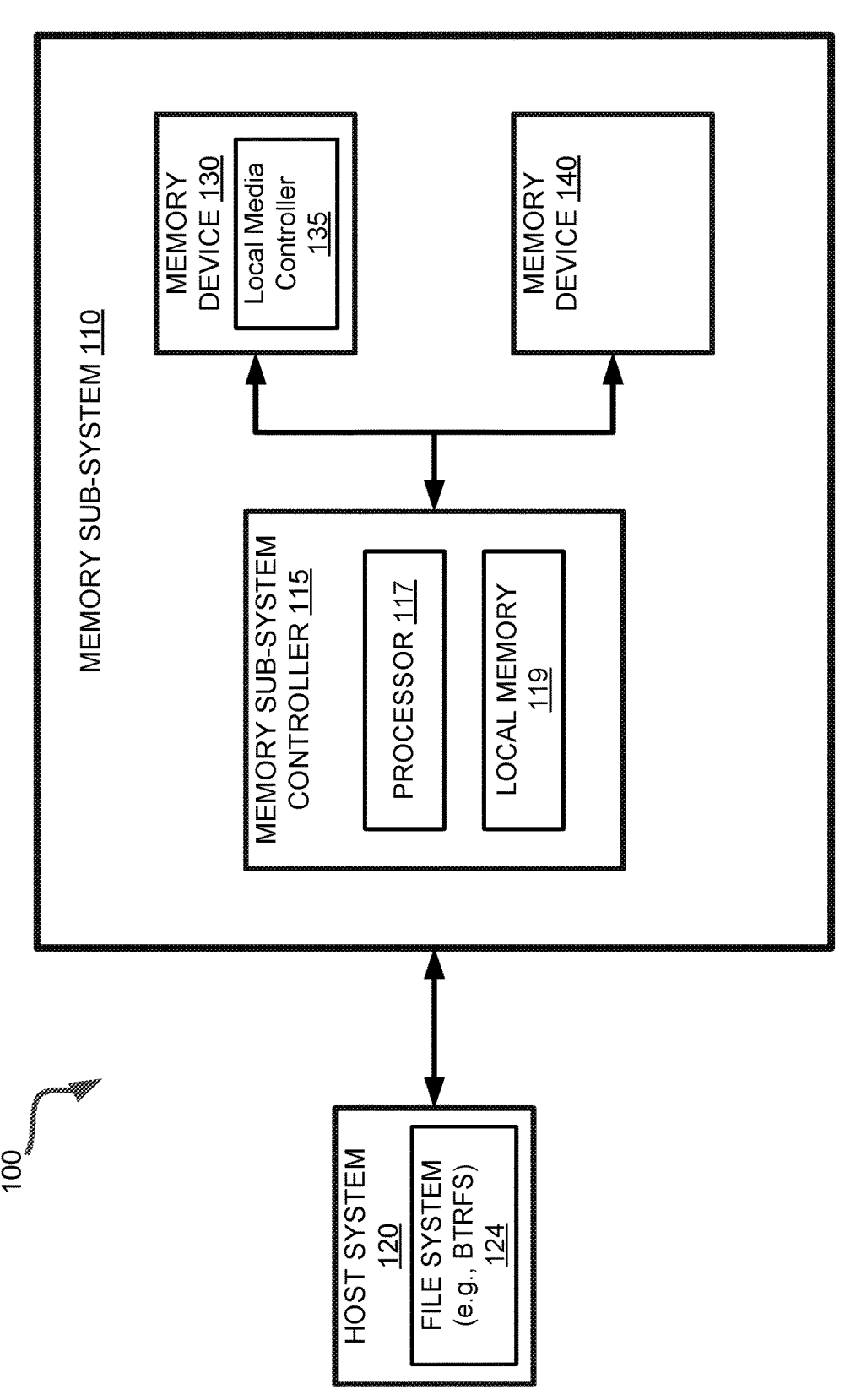
FIG. 1 illustrates an example computing system that includes a host system and a memory sub-system, in accordance with some embodiments of the present disclosure.

Aspects of the present disclosure are directed to file system storage allocation that is based on zones of a memory sub-system. The memory sub-system can be a storage device, a memory module, or a combination of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

The memory sub-system and memory devices can store data from the host system in storage media, e.g., integrated circuit (IC) dies having addressable memory cells that individually store the data. Processing in certain memory sub-systems today is generally performed with random allocations to the memory devices and in small increments of data, e.g., four kilobytes (KB). These random allocations of a page or a block of data include non-sequential and/or random writes to the memory devices. This practice results in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snapshotting and logging is done to persist the mapping data structures across shutdowns and surprise power failure situations. This adds additional write overhead to the IC dies and performance loss.

Storage stacks are in the process of being modified to take advantage of sequential input-output (IO) memory device efficiencies. For example, storage stacks included in file systems group data by locality (e.g., according to thread, process, or application) and write the data sequentially to storage devices. File systems can then write data of different localities as parallel sequential streams to storage devices, each stream having its own locality. Reference to locality can reference either temporal locality or spatial locality. Data having temporal locality is data that a processor tends to access at the same memory locations repetitively over a short period of time, e.g., data written, over-written, and trimmed around the same time. Data having spatial locality captures the tendency that when a memory device references a particular storage location at a particular time, then the memory device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data having locality are written sequentially, the data are written to groups of memory cells that are also referred to as zones for simplicity, where each zone can store multiple physical blocks of data. Thus, mapping can be recorded at a higher granularity (megabytes instead of kilobytes) in order to map a particular data group as a zone in the LBA space, which significantly reduces metadata that is logged. The mapping space associated with the LBA space at this granularity can be referred to as zoned namespace (ZNS), and a memory device written in this manner referred to as a ZNS memory device. In one example, a data group is made up of multiple blocks of data having either temporal and/or spatial locality, where each data block corresponds to a physical block (e.g., erase unit) of the IC dies. In one embodiment, the physical block of a memory device can be around 16 megabytes (MB) in size. The groups of memory cells (or zones) can be at least two to four times (or more) the size of the physical block. Accordingly, the zones can store at least 64 MB of data (e.g., 64 MB, 128 MB, 256 MB, 512 MB, or more), each of which is significantly larger than four kilobytes (KB).

In certain host operating systems, a file system handles management of files from the operating system, from applications running on the operating system, and metadata generated by the file system for purposes of organization of files and allocation of space in the memory devices necessary to write the files and metadata as they are generated. File systems of certain host operating systems such as Linux, Unix, and the like, allocate block groups (e.g., file system storage units) to a series of physical addresses of the memory device at which to store the block group. The files can include file data, file metadata (e.g., index nodes (in-odes)), directory structure, free space manager, and the like, and other data structures (or objects) capable of packaging data/metadata and being written to the memory device, which will be discussed in more detail. The file systems typically allocate certain types of block groups to a particu-lar series of physical addresses of the memory device based on whether the block groups contain data or metadata, and try not to intermix the data and metadata within these particular series of physical addresses.

Conventional file systems (e.g., BTRFS) are not adapted to allocate block groups that are mapped to zones (e.g., block group is the size of a zone) or to write to the zones sequentially as done within zones of ZNS-managed memory devices. Until now, sequential writing to ZNS-managed memory devices has been managed at the memory device level by a memory sub-system controller, e.g., which acts as an intermediary between the file system of the host and the storage device. Management within the memory sub-system controller adds a level of complexity, including LTP address mapping, logging metadata, and corresponding resource requirements for handling non-sequential IO writes despite the majority of the IO writes being sequential write opera-tions.

At least some aspects of the present disclosure address the above and other deficiencies through configuring the host system (e.g., the file system of the host operating system) with the ability to more efficiently store the data of the file system objects in the zones of the memory devices. Some aspects of the present disclosure also or alternatively con-figure the host system with the ability to associate one or more zones with particular data types and allocate storage (e.g., group of memory cells) in each zone to store these particular data types. In this way, the file system uses zones for file/data structure management and storage allocation within memory devices of ZNS-managed memory devices.

Further, copy-on-write (COW) management of storage devices is generally best suited for sequential writing because, once data is written, the data is not overwritten (e.g., data is never overwritten). More specifically, COW is a resource-management technique in computer program-ming to efficiently implement a duplicate or copy operation on modifiable resources in memory. If a resource is dupli-cated but not modified, it is not necessary to create a new resource; the resource can be shared between the copy and the original. Where a file system writes to a storage device sequentially, it is more efficient to do so using COW management. For example, data of a similar type can be written as a group and thus can eventually be rewritten elsewhere as a group as well, before becoming stale and subject to garbage collection, including erasure. Writing data of the same data type as a group can thus minimize garbage collection and reduce write amplification. Further, in some embodiments, the kernel of the host operating system includes device mapping logic that can directly cause the file system data to be written to physical addresses of individual zones and thus map logical addresses to physical addresses of sequentially-written zones, by-passing the need for the memory sub-system controller to handle this mapping.

Advantages of the present disclosure include but are not limited to significantly minimalizing garbage collection and reduced write amplification due to writing data with similar data types in groups sequentially by zone. Further, the load balancing of performing writes across multiple zones for different data types enables predictable write performance, where writes are often a bottleneck in current file systems. In one example, the organization of data type files into streams and directing those streams to be written at identi-fied zones is performed at the file system of the host, including ZNS device mapping capability performed by the kernel of the host operating system. Other advantages include significant mapping overhead reduction as well as reduction in periodic snapshotting and logging that would otherwise be performed to persist mapping data structures in case of power failure/shutdown. Other advantages will be apparent to those skilled in the art of memory allocation and mapping to memory devices discussed hereinafter.

FIG. 1 illustrates an example computing system 100 that includes a memory sub-system 110 and a host system 120 in accordance with some embodiments of the present disclo-sure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative con-nection or direct communicative connection (e.g., without intervening components or devices), whether wired or wire-less, including connections such as electrical, optical, mag-netic, and the like.

The host system 120 can include a processor chipset and a software stack executed by the processor chipset. The processor chipset can include one or more cores, one or more caches, a memory controller (e.g., NVDIMM control-ler), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The computing system 100 includes a file system 124 in the host system 120 that is configured with file organization and storage allocation functionality discussed herein throughout the Figures. In some embodiments, the host system 120 includes at least a portion of the file organization and storage allocation functionality. In other embodiments, or in combination, the controller 115 and/or a processing device of the host system 120 includes at least a portion of the file organization and storage allocation functionality. For example, the controller and the processing device (processor) of the host system 120 can be configured to execute instructions stored in memory for performing the operations of the file organization and storage allocation functionality described herein.

Figure 2:
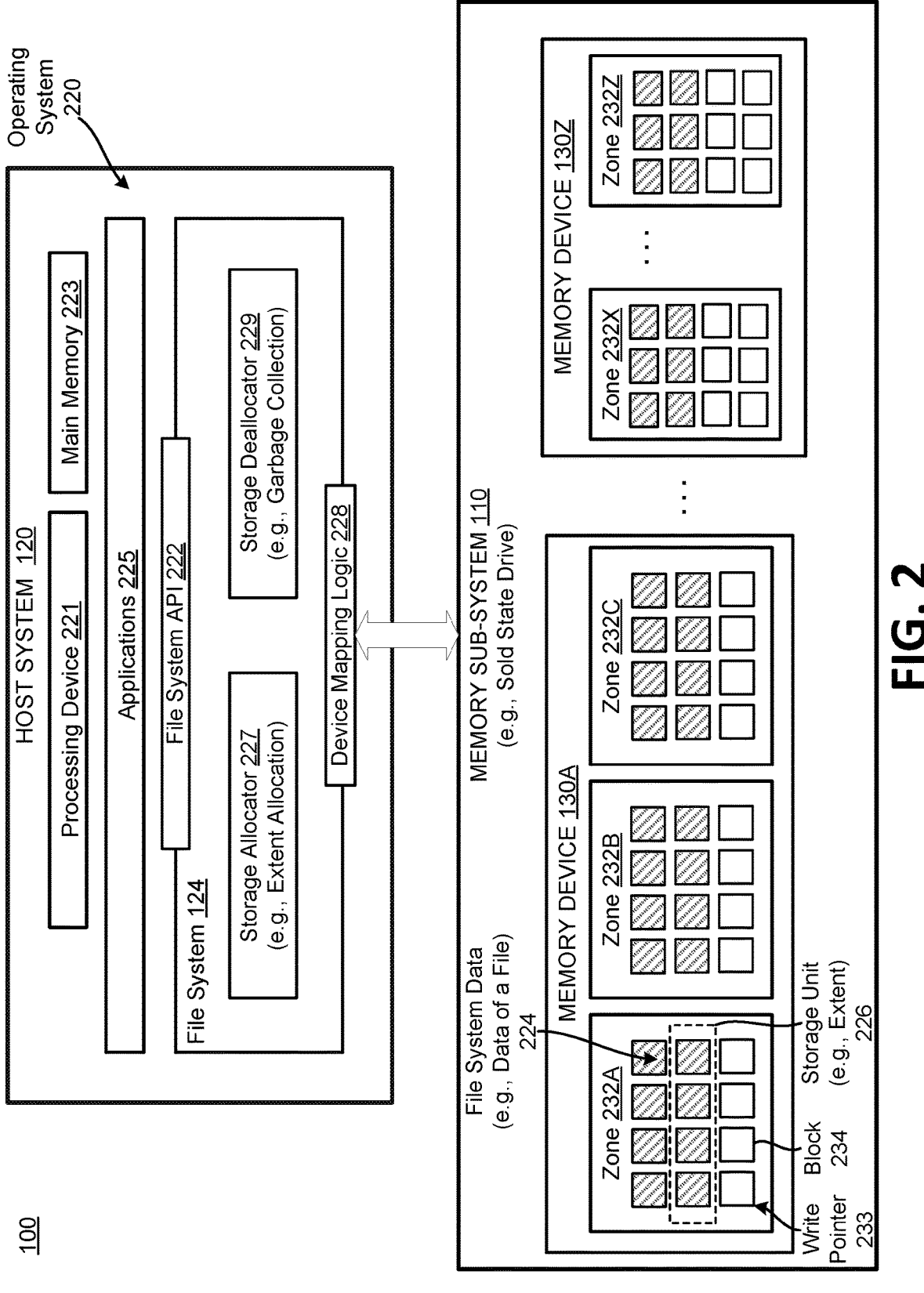
FIG. 2 is a detailed block diagram of the computing system of FIG. 1 in accordance with some embodiments of the present disclosure.

FIG. 2 is a detailed block diagram of the computing system 100 that includes a file system that uses the multiple zones of a memory sub-system to more efficiently store data. In the example shown, host system 120 includes a file system 124, one or more applications 225 and the memory sub-system 110 includes multiple zones 232A-Z that are spread across one or more memory devices 130A-Z.

File system 124 can manage the storage and retrieval of data from the memory sub-system 110. File system 124 can include data structures and rules used to organize the data and can involve separating the data into storage units that that can be individually identified and accessed. File system 124 can be integrated into a kernel, a device driver, an application, other portion of operating system 220, or a combination thereof. File system 124 can execute as one or more system processes (e.g., kernel processes), user processes (e.g., application processes), or a combination thereof.

File system 124 can include multiple layers and the multiple layers can include a logical file system (e.g., logical layer), a virtual file system (e.g., virtual layer), a physical file system (e.g., physical layer), or other layer. The logical file system can manage interaction with applications 225 and can provide an application program interface (e.g., File System API 222) that exposes file system operations (e.g., open, close, create, delete, read, write, execute) to other computer programs. The logical layer of file system 124 can manage security and permissions and maintain open file table entries and per-process file descriptors. The logical file system can pass requested operations (e.g., write requests) to one or more other layers for processing. The virtual file system can enable operating system 220 to support multiple concurrent instances of physical file systems, each of which can be referred to as a file system implementation. The physical file system can manage the physical operation of the storage device (e.g. memory sub-system 110). The physical file system can handle buffering and manage main memory and can be responsible for the physical placement of storage units in specific locations on the memory devices 130A-Z. The physical file system can include device mapping logic 228 and can interact with device drivers or with the channel to interact with memory sub-system 110. One or more of the file system layers can be explicitly separated or can be combined together in order to store file system data 224.

File system data 224 can be any data associated with file system 124 and can include data received by file system 124 or data generated by file system 124. File system data 224 can represent data of one or more external file system objects, internal file system objects, or a combination thereof. The external file system objects can be file system objects that are externally accessible by a computer program (e.g., applications 225) using file system API 222. The external file system objects can include files (e.g., file data and metadata), directories (e.g., folders), links (e.g., soft links, hard links), or other objects. The internal file system objects can be file system objects that remain internal to the file system and are inaccessible using file system API 222. The internal file system objects can include storage tree objects (e.g., extent map, extent tree, block tree), stream objects (e.g., stream identifiers), file group data (e.g., group of similar files), storage units, block groups, extents, or other internal data structures.

Each file system object can be associated with object data and object metadata. The object data can be the content of the object (e.g., file data) and the object metadata can be information about the object (e.g., file metadata). The object metadata can indicate attributes of the object such as a storage location (e.g., zone, block group, storage unit), data source (e.g., stream, application, user), data type (e.g., text, image, audio, video), size (e.g., file size, directory size), time (e.g., creation time, modification time, access time), ownership (e.g., user ID, group ID), permissions (e.g., read, write, execute), file system location (e.g., parent directory, absolute path, local path), other attribute, or a combination thereof. In one example, file system data 224 can include data for a new file and the new file can include file data and file metadata. The file data can include the content of the file (e.g., image content, audio content) and the file metadata can include one or more attributes of the content (e.g., identifier corresponding to a zone z, stream s, and/or application a).

The object data and object metadata (e.g., attributes, tree nodes) can be stored together in the same data structure at the same storage location or can be stored separately in different data structures at different storage locations. For example, file system 124 can store the object metadata in an index node (e.g., inode) data structure and the index node data structure can have one or more pointers to the object data. The inode can be a data structure in a Unix-style file system that describes a file system object. Each inode can indicate the attributes and storage locations (e.g., block addresses) of the data of the file system object. A directory can be represented as an inode and can contain an entry for itself, its parent (e.g., parent directory), and each of its children (e.g., child directories or files). File system 124 can store file system data 224 as one or more storage units 226.

Storage unit 226 can be a contiguous or non-contiguous portion of file system data that is to be stored in a memory device. The storage units can be referred to as file system storage units and can have any size (e.g., 4 KB, 128 KB, 16 MB, 128 MB, 1 GB) and the size can or cannot be based on (e.g. a multiple of) the size of one or more memory storage units (e.g., cells, blocks, pages, zones, dies, devices, or sub-systems). File system 124 can use a fixed size (e.g., constant size or static size) for the storage units in which all of the storage units can be the same size or can use a variable size (e.g., adjustable size, dynamic size) in which the storage units used by file system 124 can have different sizes. The size of the storage unit can be determined (e.g., selected or detected) by storage allocator 227, file system 124, host system 120, memory sub-system 110, memory device 130, other entity, or a combination thereof. The size of storage unit 226 can be determined by the entity before, during, or after design, development, manufacture, installation, initialization, configuration, formatting, other event, or a combination thereof. In one example, each of the storage units 226 can be the same or similar to a file system block group.

File system 124 can divide allocated space into block groups which can be variable-sized allocation regions. The allocation regions can be used to store object metadata (e.g., extent tree node, inodes) and object data (e.g., file content, extents). A block group (BG) can be understood as a contiguous portion a file system object (e.g., a series of LBAs) that is allocated to a contiguous area of a memory device and is reserved for file system data of file system 124. This contiguous area can be represented as a range of block numbers (e.g., physical addresses). Larger files can be partitioned into the block groups that are individually tracked to make allocation and management of the files feasible over a necessary series of allocation and writes to memory devices 130A-Z. The default ratio of object data to object metadata can be 1:2. They are intended to use concepts of the Orlov block allocator to allocate related file system objects together and resist fragmentation by leaving free space between groups. (Ext3 block groups, however, have fixed locations computed from the size of the file system, whereas those in b-tree file system are dynamic and created as needed.) Each block group can be associated with a block group identifier (e.g., block group item). Modes in the file system tree can include a reference to a corresponding block group (e.g., pointer to storage unit).

An extent is a contiguous area of storage reserved for a file system object of file system 124. Each file system object can consist of zero or more extents and each extent can store a fragment, segment, or portion of the file system object. Each extent can be represented by a one or more numbers (e.g., number pair) and each of the numbers can be a location, position, address, other numeric value, or a combination thereof. In one example, each extent can be represented by a pair of numbers that represent a range (e.g., beginning and end of a range of blocks). Representing an extent as a number pair can be more efficient then canonically storing every block number in the range. The use of extents can also enable the file system to reduce metadata overhead of large files. By way of example, an extent can be allocated inside a block group (BG). For example, suppose a large file of 10 gigabytes (GB) is chunked into pieces of 128 megabytes (MB). Multiples of the 128 MB chunks can be grouped together as extents into an extent map linked to the larger file and that includes metadata. File system 124 can build and retain extent maps to manage these extents or block groups. In some embodiments, extent trees are intended to divide up the available storage of the memory device 130 into a number of flexible allocation policies. Each extent tree can own a section of the underlying memory device, and can be assigned to a collection of (or a single) tree roots, directories or index nodes (inodes). The manner in which file system 124 allocates and deallocates storage units (e.g., extents, block groups) can depend on whether the file system is a copy on write file system.

A copy on write file system can be a file system that implements a copy on write (COW) features for managing file system operations. The copy on write features can be in contrast to a more traditional technique that enables file system data to be written in-place. Copy on write can be referred to as implicit sharing or shadowing and can be a resource management technique that implements a copy operation (e.g., duplicate operation) for resources that are modified. This can involve making a copy of object data (e.g., file data) before modifying the object data. In one example, a copy on write file system can detect if an incoming resource is a duplicate of an existing resource and avoid creating a new resource by sharing access to the existing resource. For example, file system 124 can receive a request to store a new file that is the same as an existing file and instead of storing a duplicate copy of the data for the new file, the file system can associate the new file with the data of the existing file. When a request is received to access the data of the new file, the file system can return data from the existing file. Therefore, the storage resources can be shared between a duplicate and an original copy of the data. Any write request received for the new or existing files can result in a copy being created and the two files can no longer share a single copy. The write request can include a change that is applied to the original copy (e.g., source storage) or to the new copy (e.g., destination storage) depending on the implementation.

By sharing resources in this way, it is possible to significantly reduce the resource consumption of unmodified copies, while adding a small overhead to resource-modifying operations (e.g., write requests). Copy on write file systems can be better suited for sequential writing because, once data is written, the data cannot be overwritten. When a file system writes to a storage device sequentially, it is more efficient to do so using COW management. For example, data of a similar type can be written as a group and thus can eventually be rewritten elsewhere as a group as well, before becoming stale and subject to garbage collection, including erasure. Writing data of the same data type as a group can thus minimize garbage collection and reduce write amplification. Further, in some embodiments, the kernel of operating system 220 can include device mapping logic 228 that can directly cause the file system data to be written to physical addresses of individual zones and thus map logical addresses to physical addresses of sequentially-written zones, by-passing the need for the memory sub-system controller to handle this mapping.

A B-Tree File System (BTRFS) can be an example of a copy on write file system that uses a B-Tree to process data updates. The B-tree can be a self-balancing tree data structure that maintains sorted data and allows searches, sequential access, insertions, and deletions in logarithmic time. The B-tree can be similar to a binary search tree (e.g., binary tree) and can enable nodes with more than two children. The b-tree file system can involve block management that can group blocks into block groups and each block group (e.g., storage unit 226) can be composed of one or more device extents. The extents of a block group can belong to the same memory device or different memory devices (e.g. in the case of striping). The b-tree file system can support changes the default device storage unit size (e.g., extent size) to the size of a zone so that the storage units are aligned with a zone. The allocation of blocks within a block group can involve allocating sequential blocks from the beginning of the block group and an allocation pointer can be added to block groups as an allocation hint. The allocation pointer can enable blocks to be allocated sequentially within a block group (e.g., sequentially within a zone). The b-tree file system can include a write request staging list that can account for IO that is received out of order. The staging list can delay the execution of unaligned write requests within a block group. The zones of a block group are reset to allow rewriting only when the block group is being freed, that is, when all the blocks within the block group are unused.

In the example shown in FIG. 2, file system 124 can include a storage allocator 227 and a storage deallocator 229 to manage storage space for file system data 224. Storage allocator 227 can interact with memory sub-system 110 to allocate storage space on memory devices 130A-Z. Storage allocator 227 and the storage allocation algorithm are discussed in more detail in regards to FIGS. 3-5. Storage deallocator 229 can interact with memory sub-system 110 to deallocate (e.g., free) storage space on memory devices 130A-Z. Storage deallocator 229 can perform garbage collection of stale blocks of memory that can be erased and written to again. Storage allocator 227 and storage deallocator 229 can be optimized for storing data in zones 232A-Z of memory sub-system 110.

Memory sub-system 110 can include high density non-volatile memory devices where retention of data is desired when no power is supplied to the memory device. One example of non-volatile memory devices is a negative-and (NAND) memory device. Other examples of non-volatile memory devices are described above in conjunction with memory device 130 of FIG. 1. A non-volatile memory device is a package of one or more dies with sets of blocks (e.g., physical blocks) and each block can include a set of pages. A page can include a set of cells (e.g., memory cells) and each cell can be an electronic circuit that stores information. Depending on the cell type, a cell can store one or more bits of binary information and can have various logic states that correlate to the number of bits being stored. The logic states can be represented by binary values, such as "0" and "1", or combinations of such values.

Memory devices 130A-Z can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline can constitute the address of the memory cell. A block 234 can refer to a unit of the memory device (e.g., 130A) used to store data and can include a group of memory cells, a wordline group, a wordline, or individual memory cells. One or more blocks can be grouped together to form a zone of a memory device.

Each of the zones 232A-Z can be a contiguous or noncontiguous portion of a memory device (e.g., range of blocks) that is identified and managed as a single unit. Each zone can correspond to zone identification data that can be used to uniquely identify the zone and can be the same or similar to a zone identifier (zone ID), a zone descriptor, a zone label, or other term. A zone can be a memory storage unit and can have a predefined size that can or cannot be based on (e.g. a multiple of) a size of another memory storage unit (e.g., cell, block, page, die, device, or subsystem). Memory sub-system 110 can use a fixed size (e.g., constant size or static size) for the zones in which all of the zones can be the same size or can use a variable size (e.g., adjustable size, dynamic size) in which the zones used by memory sub-system 110 can have different sizes. The size of the zone can be determined (e.g., selected or detected) by memory sub-system 110, memory device 130, file system 124, host system 120, storage allocator 227, other entity, or a combination thereof. The size of storage unit 226 can be determined by the entity before, during, or after design, development, manufacture, installation, initialization, configuration, formatting, other event, or a combination thereof.

Zones 232A-Z can enable more efficient management of storage space as the capacity of the memory device increases. For example, a set of one or more zones can be designated for use by a specific application (e.g., application, process, or thread) executed by the host system or some other system with access to the memory device. Writing to the zones is generally performed sequentially. The sequential write can be performed consecutively from the top of the memory device (e.g., smaller addresses of IC die) to the bottom of the memory device (e.g., larger addresses of the IC die), which is illustrated by the patterned blocks of data already written to the illustrated zones 232A-Z. In these embodiments, the device mapping logic 228 can track block numbers (e.g., logical block addresses) of a name space.

The namespace can include the address space of one or more of the memory devices 130A-Z. A namespace is a quantity of non-volatile memory that can be formatted into blocks (e.g., logical or physical blocks). A controller for memory devices 130A-Z (e.g., controller 115 or 135) can support multiple namespaces that are referenced using namespace identification data (e.g., namespace IDs). A namespace can be associated with a namespace data structure that is created, updated, or deleted using Namespace Management and Namespace Attachment commands. The namespace data structure can indicate capabilities and settings that are specific to a particular namespace. In one example, the name data structure and the namespace can correspond to a zoned namespace.

A zoned namespace (ZNS™) can be a sequential namespace that is defined by the NVM Express' (NVMe™) organization. A memory device that is configured with a zone namespace can be referred to as a zoned namespace memory device or a ZNS memory device and can implement the Zoned Namespace Command Set as defined by NVMe. In a zone namespace, the address space of each of the memory devices 130A-Z can be divided into one or more zones 232A-Z. When using a zone namespace, writes are performed sequentially starting from the beginning of a zone and can be performed at a larger granularity (e.g., 64 kilobytes) and the zone can be inaccessible for the duration of the write operation. Accordingly, if a read request for data stored in the same zone or a different zone is received while the write operation is ongoing, the memory sub-system will have to suspend the write operation in order to perform the read. In one example, the zoned namespace can be implemented by a controller of a solid state drive (SSD) and include zones 232A-Z, in which there can be one or more zones for each of the one or more memory devices 130A-Z.

Each of zones 232A-Z can correspond to a write pointer (WP) that identifies a location in the zone where a prior sequential write ended. The write pointer 233 can correspond to zone 232A and can point to a beginning of a block (e.g., first available block), an end of a block (e.g., last block written to), a location within a block, or other location. Write pointer 233 can be stored and accessible to the controller of memory device 130A (e.g., controller 135), a controller of memory sub-system 110 (e.g., controller 115), processing device 221 of host system 120 (e.g., in main memory 223), other device or location, or a combination thereof. The write pointer can be used to determine whether an IO write request is directed to the write pointer, and thus is sequential, or is not directed to the write pointer, and is thus non-sequential. The write pointer for each zone can be accessible to the file system 124 for purposes of storage space allocation within the memory device 130A. For example, write pointer 233 can be stored as metadata of a file system object (e.g., metadata of a file system block group) and be used for sequential writes, as discussed in more detail below.

File system 124 can include a file system API 222 that enables computer programs (e.g., applications 225) to store or retrieve data. File system API 222 can enable file system 124 to receive data from external sources, including data from applications 225 (also referred to as user data), operating system (e.g., superblocks of data, file system metadata, and the like), which will be discussed in more detail with reference to FIG. 6. With access to such metadata about these various files of different data types, the file system API 222 can be able to enable file system 124 to perform organization and storage allocation.

The applications 225 can include different types of computer programs or architectures, which function differently with respect hardware and supporting software of the computing system 100. In one embodiment, applications 225 can include a log structure merge (LSM)-based architecture such as a database (e.g., Apache Cassandra™), a staged event-driven architecture (e.g., SEDA), a distributed storage and replication architecture (e.g., Dynamo by Amazon®), a data and storage engine model (e.g., Bigtable by Google®), or other such storage engines designed to process and organize structured data, including big data, for example. In some embodiments, using an LSM-based architecture as an example, the applications 225 can handle a variety of files containing data and/or metadata of different data types. Each of the applications 225 can thus generate, access, and/or manage files of one or more data types.

Figure 3:
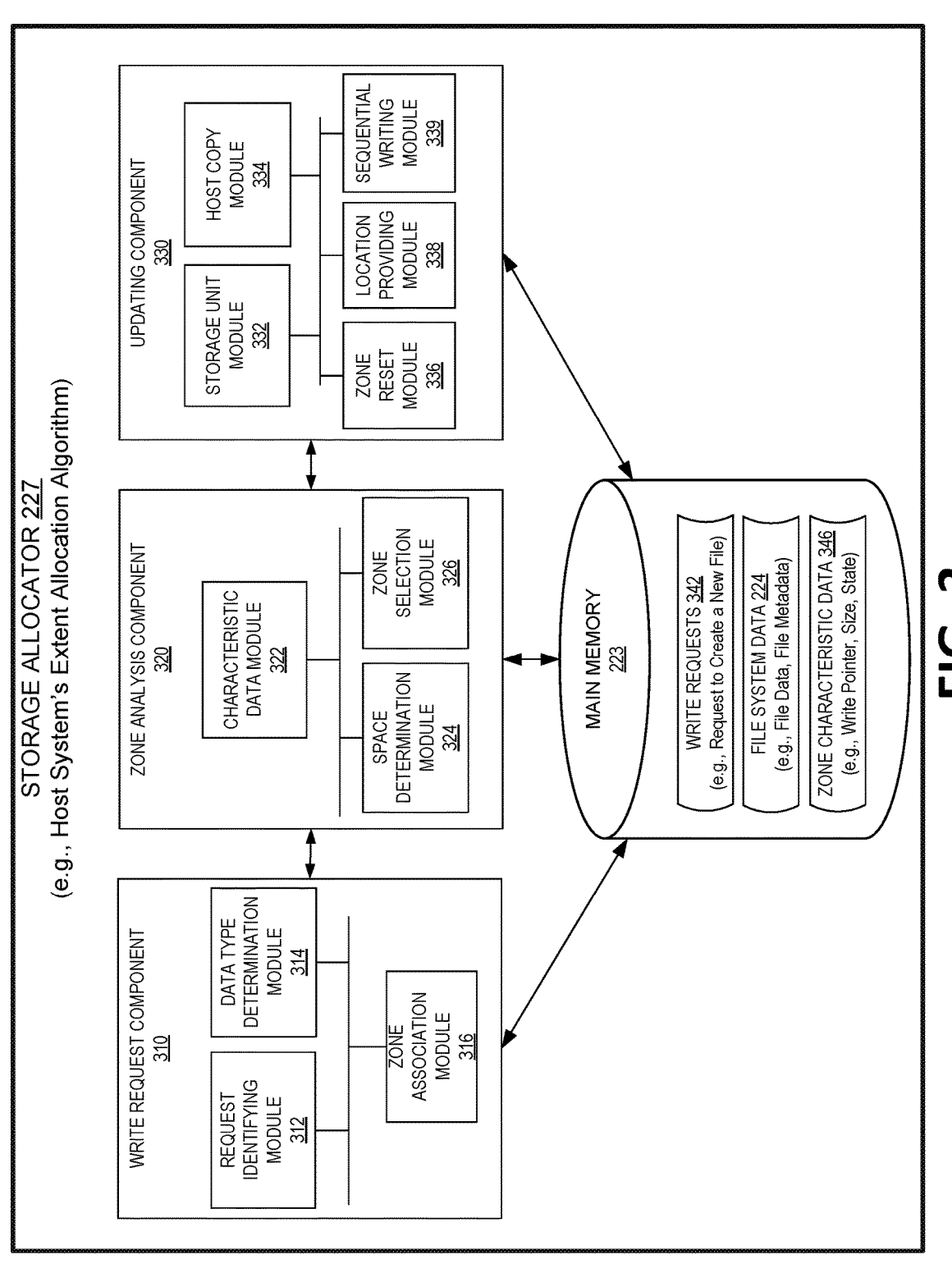
FIG. 3 is a detailed block diagram of the storage allocator of the file system of FIG. 2, in accordance with some embodiments of the present disclosure.

FIG. 3 is a block diagram illustrating an exemplary storage allocator 227 of file system 124 that implements a storage allocation algorithm in accordance with some embodiments of the present disclosure. The features discussed in regards to the component and modules in FIG. 3 can be implemented in software (e.g., computer code) or hardware (e.g., circuitry) of host system 120 or memory sub-system 110. More or less components or modules can be included without loss of generality. For example, two or more of the components can be combined into a single component, or features of a component can be divided into two or more components. In the example illustrated, storage allocator 227 can be the same or similar to the storage allocator 227 of FIG. 2 and can include a write request component 310, a zone analysis component 320, and an updating component 330.

Write request component 310 can enable the file system to analyze write requests and make determinations on how the write requests should be processed. The determinations can be based on an analysis of data associated with the write requests 342, file system 124, zones 232A-Z, host system 120, memory sub-system 110, memory devices 130A-Z, other portion of computer system 100, or a combination thereof. Each of the write requests 342 can correspond to one or more commands (e.g., operations, instructions, opcodes) and the commands can be for a write, append copy, move, modify, update, delete, erase, reset, remove, other command, or a combination thereof. A write request can be represented as a data structure that includes file system data 224 discussed above and can include or be associated with one or more attributes (e.g., linked with metadata). The attributes can be updated as the write request is processed and can include attributes based on time (e.g., incoming time stamps), size (e.g., write sizes), state (e.g., received, processing, applied), data type (e.g., type of data to be stored), zone (e.g., zone associated with the data), other attribute, or a combination thereof. In one example, write request component 310 can include a request identifying module 312, a data type determination module 314, and a zone association module 316.

Request identifying module 312 can identify one or more of the write requests 342 to be processed by file system 124. One or more of write requests 342 can be received from a source external to the file system (e.g., application or other operating system source), a source internal to the file system (e.g., units that perform data deduplication, defragmentation, or garbage collection code), other source, or a combination thereof. The write requests can initially be stored in temporary storage, which can include one or more queues (e.g., modification queue), buffers (e.g., write buffers), journals (e.g., file system journals), logs (e.g., write logs), other storage structures, or a combination thereof. Request identifying module 312 can access write requests 342 from the temporary storage and select one or more of the write requests to be processed. The order in which the write requests are selected (e.g., identified) can be based on the content and attribute of the write request.

Data type determination module 314 can determine one or more data types associated with the file system data 224 of write requests 342. The data types can be determined based on the source (e.g., application process, kernel process), the frequency of modification (e.g., read-only), file system object types (e.g., file, directory, link), file types (e.g., executable, library), file name extension (e.g., DOC, XCL, DLL), data encoding (e.g., video, audio, text), formatting, encryption, other aspect, or a combination thereof. In one example, file system data 224 of the write request can include file data (e.g., file content) and file metadata (e.g., file attributes) and data type determination module 314 can determine which portions of the file system data include which data types. This can be advantageous because data having a first data type (e.g., file metadata) can be stored at a first location and data having a second data type (e.g., file content) can be stored at a second location.

Zone association module 316 can determine whether the file system data of the write requests is associated with any zones. Determining whether there is an associated zone can involve identifying a source entity or destination object associated with the file system data of the write request. The source entity can be identified based on entity identification data (e.g., stream ID, application ID, process ID, user ID, device ID, host ID) and the destination object can be identified based on object identification data (e.g., inode, file name, ID). Zone association module 316 can then use the identification data to access data about the entity or object which can indicate the presence or absence of an associated zone. In one example, zone association module 316 can determine that the file system data of the write request corresponds to an existing file system object that is associated with a zone (e.g., stream or file with an assigned zone) and can associate the zone with the file system data of the write request. In another example, zone association module 316 can determine that the file system data of the write request corresponds to a new file system object that has not been associated with a zone (e.g., absent, without, or missing an assigned zone). In either example, zone association module 316 can indicate the presence or absence of the zone by updating an attribute that can be accessible to zone analysis component 320.

Zone analysis component 320 can analyze zones in view of the write requests 342 to determine which zones can be used to store the file system data 224. The zones can be previously associated with a file system object associated with the write request or can be selected by the zone analysis component to add a zone or change a previously associated zone. Zone analysis component 320 can analyze the zones based on zone characteristic data 346. Zone characteristic data 346 can indicate physical characteristics, logical characteristics, virtual characteristics, or other characteristics of memory sub-system 110 and memory devices 130A-Z. For example, zone characteristic data 346 can include data that includes or indicates characteristics related to storage quantities (e.g., quantity occupied, quantity available, size, capacity), locations (e.g., starting address, ending address, write pointer address), states (e.g., open, closed, full, empty), rate (e.g., connection speed, write speed, read speed), other data, or a combination thereof. The characteristics can correspond to one or more particular zones 232A-Z, blocks 234, memory cells, controllers, other portion of memory sub-system 110, or a combination thereof. Zone characteristic data 346 can include or indicate physical locations (e.g., physical addresses), logical locations (e.g. logical addresses), virtual locations (e.g., virtual addresses), or a combination thereof. The zone characteristic data 346 can include data that enables garbage collection, error correction, wear leveling, address translation, other function, or a combination thereof. In the example illustrated, zone analysis component 320 can include a characteristic data module 322, a space determination module 324, and a zone selection module 326.

Characteristic data module 322 can enable the file system to receive and store zone characteristic data. The zone characteristic data can be received by file system 124 of host system 120 from a controller of the memory sub-system. The data received from the controller can be transformed, aggregated, filtered, sorted, organized, enhanced, supplemented, or modified before, during, or after it is stored as zone characteristic data 346 in main memory 223. Zone characteristic data 346 can be received when the host system 120 or memory sub-system 110 is powered on, initialized, communicated with, accessed, modified, or requested. The zone characteristic data can be received in response to a request sent by a portion of the host system (e.g., file system, device driver, kernel, application) or automatically transmitted by the memory sub-system 110 in the absence of a request by the host system 120.

Space determination module 324 can enable the file system to determine whether one or more zones have available storage space. Space determination module 324 can determine whether the available storage space in a zone is sufficient or insufficient for a storage unit (e.g., 4 KB, 1 MB, 1 GB chunk). In one example, determining whether the available storage space is sufficient can involve determining whether the zone has a contiguous portion of space that is large enough to fit the storage unit. A zone with multiple portions of storage space that are all smaller than the storage unit but in aggregate are larger than the storage unit can provide insufficient space. In another example, determining whether the available storage space is sufficient can involve aggregating the storage space of one or more portions of available storage space. When the aggregate available storage amount (e.g., size or capacity) is equal to or greater than the storage unit, the space determination module 324 can indicate the zone has sufficient available storage space, even though none of the contiguous portions of available storage are large enough to fit the storage unit. Conversely, when the aggregate available storage amount (e.g., size or capacity) is less than the storage unit, the space determination module 324 can indicate the zone has insufficient available storage space.

The determination of available storage space can involve analyzing zone characteristic data 346 and performing one or more comparisons, calculations, inspections, other operations, or a combination thereof. In one example, space determination module 324 can determine whether there is sufficient space in a zone based on a write pointer of the zone and can compare a location of the write pointer to an end location of the zone. In another example, space determination module 324 can determine whether there is sufficient space in a zone by analyzing a portion of the zone characteristic data that indicates the amount of available storage space (e.g., unoccupied, empty, blank, unwritten storage) or the amount of unavailable storage space (e.g., occupied, written, in-use, malfunctioning, over provisioned storage) of the zone. The amount of unavailable storage space can be compared with the total capacity of the zone to determine the available storage space (e.g., zone capacity–unavailable storage=available storage). In yet another example, space determination module can communicate a size (e.g., storage unit size, block group size) with the memory sub-system 110 and receive a response indicating whether the zone has sufficient storage space. In either of these examples, the space determination module 324 can indicate whether the zone has sufficient space or insufficient space and the zone selection module 326 can or cannot use this information.

Zone selection module 326 can enable file system 124 to select a set of one or more zones of the memory sub-system 110 to store file system data 224. The set of zones can include a single zone or can include multiple zones that are on the same memory device or on different memory devices. Zone selection module 326 can access data of one of the other modules and can select one or more zones based on the previously associated zones (or lack thereof), data type matching, sufficiency of storage space, data striping, other aspect, or a combination thereof. Zone selection module 326 can select the same zones that are associated with the file system data 224 as discussed above in regards to the zone association module 316 or can select different zones.

Zone selection module 326 can select a set of one or more zones based on the type of data being written to the memory device. Zone selection module 326 can determine one or more data types associated with the zones. Each of the zones can be associated with one or more data types and the association with the data type can be reflected by data of file system 124, zone characteristic data 346, or a combination thereof. Zone selection module 326 can compare the data type of file system data 224 with data types of the zones and select a set of one or more zones based on the comparison. In one example, write requests 342 can include file system data that has different types of data. A first portion of the file system data can have a first data type (e.g., file data) and a second portion of the file system data can have a different data type (e.g., file metadata). Zone selection module 326 can select different zones based on the different types of data and a first set of zones (e.g., one or more zones) can be selected for the first portion and a second set of zones (e.g., one or more zones) can be selected for the second portion. The zones selected by the zone selection module 326, can be made accessible to an updating component 330.

Updating component 330 can enable file system 124 to communicate with the memory sub-system 110 to allocate storage space and to store file system data on the memory devices. In the example illustrated, updating component 330 can include a storage unit module 332, a host copy module 334, a zone reset module 336, a location providing module 338, and a sequential writing module 339.

Storage unit module 332 can enable the file system 124 to allocate space for storages units in the selected zones of one or more memory devices. As discussed above, a storage unit can be a contiguous portion of a memory device reserved for a portion of a file system object. Storage unit module 332 can identify a location in one or more memory devices based on the selected zone, zone characteristic data (e.g., write pointer, beginning of zone, end of zone), other data, or a combination thereof. Storage unit module 332 can enable the file system to communicate with memory sub-system to allocate storage space at the identified location. The file system can use storage unit module 332 to allocate storage space and can execute one or more operations that format, update, add, remove, clear, designate, or other operation to modify the memory sub-system, memory device, or file system.

Storage unit module 332 can allocate one or more portions when processing each write request. This can be particularly useful when the file system uses a copy on write technique. For example, when a request to overwrite data in a single storage unit is being processed, storage unit module 332 can allocate multiple new storage units (e.g., multiple different extents). A first storage unit can be smaller and contain the overwritten data and there can be one or more larger storage units (e.g., second and third storage units) that store the unmodified data on either side of the first storage unit. To avoid having to re-write unmodified data, the storage unit module 332 can allocate bookend storage units (e.g., extents that are slices of existing extents) the location of the bookend storage units can be identified using a combination of values that includes a first location value (e.g., offset value) and a second location value (e.g., value of block, zone, or memory device).

Host copy module 334 can enable the file system to maintain a copy of the data that is stored in the zone of the memory devices. The copy can be referred to as a "host copy," "host system copy," "temporary copy," or other term. The copy can be an ephemeral copy that is stored in the host system's main memory (e.g., primary storage) and can be copied from a persistent copy in the memory sub-system (e.g., secondary storage). The copy in the memory sub-system can be the original copy (e.g., original version) and the copy in main memory can be a duplicate copy (e.g., duplicate version). The original copy and the duplicate copy can be identical (e.g., all bits have same values) or can be substantially similar, in which some of the bits of the different copies are different. This can occur when the original copy includes padding or unused portions that are storing unused data (e.g., remnants of past writes).

The host system can maintain a copy by making the copy and by updating the copy. The host system can make the copy in main memory before, during, or after the copy in the memory sub-system is modified. The host system can also update the copy in view of file system data 224 of one or more write requests 342. The updated copy can then be persistently stored by the memory sub-system after the zone that has the original copy is reset using zone reset module 336.

Zone reset module 336 can enable the host system to reset one or more zones of the memory sub-system. Resetting a zone can involve one or more operations that include erasing, updating, configuring, or formatting the zone or data of the zone (e.g., content or metadata). The zone reset module 336 can cause the host system to communicate with the memory sub-system and one or more of the operations can be executed by the host system, memory sub-system (e.g., controller 115), memory device (e.g. controller 135), other processor, or a combination thereof. In one example, resetting a zone can update a location of zone's write pointer to a new location (e.g., reset write pointer to beginning of the zone).

Location providing module 338 can enable the host system to provide a location in the memory device to the memory sub-system. In a conventional memory sub-system, the host system can provide the data that will be stored without providing a location to store the data. As disclosed herein, the host system can provide a location for the storage unit to the memory sub-system to control where the memory sub-system stores the file system data 224. The location can be a value (e.g., number, address, or identification data) of a particular zone, block, device, sub-system, other location, or a combination thereof.

Sequential writing module 339 can enable the host system to initiate a sequential write file system data 224 to a selected set of one or more zones of the memory sub-system. As discussed above, the file system data of the write requests can be applied to the copy in main memory. Sequential writing module 339 can then persistently store the copy in main memory by providing (e.g., flushing) the copy from main memory to the memory sub-system. The host system can provide the data of the sequential write in the form of one or more storage units, block groups, data streams, chunks, segments, blocks, pages, bytes, bits, other portion, or a combination thereof. In one example, the sequential writing module 339 can sequentially write the updated copy from main memory to one or more storage units in a single zone. In another example, the sequential writing module 339 can write the updated copy to multiple storage units from different zones. The latter example can involve striping data across different zones.

Host system 120 and file system 124 can implement data striping to better store file system data in memory devices. Data striping can involve striping data of a file system object or group of file system objects across a set of zones. The set of zones can include multiple zones that can be on the same or different memory devices, memory sub-systems, other device, or a combination thereof. In one example, storage unit module 332 can allocate and sequentially write to multiple storage units in different memory devices. The different memory devices can be part of the same memory sub-system or part of different memory sub-systems. In another example, storage unit module 332 can allocate and sequentially write to multiple storage units in a set of non-adjacent zones of a single memory device. A zone of the set can be non-adjacent when it is separated from all other zones in the set by a zone in at least one or more spatial directions (e.g., up/down, left/right, forward/backward). Therefore, a zone can be horizontally non-adjacent (separated by a zone along a row) or vertically non-adjacent (e.g., separated by a zone along a column). In either example, the data striping can iterate and loop through the selected set of zones.

Looping through the zones can involve breaking a file system object or group of similar file system objects into multiple storage units (e.g., 10 storage units) and selecting a set of non-adjacent zones (e.g., zone 0, zone 3, zone 10) to store the file system objects. The host system can execute the storage allocator 227 to allocate and write a first storage unit to first zone in the set (e.g. zone 0), a second storage unit to a second zone in the set (e.g., zone 3), and a third storage unit to a third zone (e.g., zone 10). The storage allocator 227 can then loop back and store the forth storage unit in the first zone (e.g., zone 0). This iteration and loopback can continue until all of the storage units are allocated and written out.

FIG. 4 is a flow chart of a method 400 for file system store allocation based on zones of a memory device, according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the host system 120 (e.g., via execution of the file system 124 by processing device 221) of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a processing device of a host system can receive zone characteristic data from a memory sub-system including a memory device. The memory device can include multiple zones and the zone characteristic data can include one or more locations in the memory device corresponding to the zones. Receiving the zone characteristic data can involve the host system receiving the zone characteristic data from a controller of the memory sub-system. The zone characteristic data can indicate characteristics (e.g., physical characteristics) of the memory device and include garbage collection data (e.g., stale blocks) and one or more physical memory locations on the memory device. The zone characteristic data can also or alternatively indicate a size, a state, or a write pointer of each of the zones. The write pointer can be a location of a memory device (e.g., logical block address (LBA)). In one example, the memory sub-system can be a Solid State Drive (SSD) and the zones can be zones that comply with Zoned Namespaces (ZNS).

At operation 420, the processing device of the host system can identify a write request that includes file system data for a file system. In one example, the file system can be a copy on write (COW) file system that copies file data before modifying the file data. The copy on write file system can use a B-Tree and be referred to as a B-Tree File System (BTRFS). The write request can be received from a source external to the file system (e.g., application or other operating system source), a source internal to the file system (e.g., data deduplication, defragmentation, or garbage collection code), other source, or a combination thereof. The write request can initially be stored in temporarily storage, which can include one or more queues, buffers, journals, logs, other storage structures, or a combination thereof.

At operation 430, the processing device of the host system can determine whether the file system data is associated with at least one of the zones. Determining whether there is an associated zone can involve identifying a source entity (e.g., a particular stream or application) or destination object (e.g., a particular file or directory) associated with the file system data of the write request. Operation 430 can inspect the data of the source entity or destination object to determine if they are or are not associated with a zone, which can then be attributed to the file system data.

In one example, the write request can be a set of multiple write requests with changes to different portions of a super-block of the file system and the host system can determine that the superblock is associated with a particular zone. The host copy can then make a copy in main memory of all data in the zone and update the copy to reflect the changes of the write requests. The host system can then erase all the data in the zone from the memory device and initiate a single sequential write of the updated copy in main memory to the zone of the memory device.

At operation 440, the processing device of the host system can allocate a storage unit based on the zone characteristic data. In one example, allocating the storage unit based the zone characteristic data can involve determining, by the host system, whether the zone of the memory device has sufficient space for the storage unit. The determination can be based on a write pointer of the zone and an end location of the zone. The host system can allocate the storage unit in the zone in response to the zone having sufficient space or allocate the storage unit in another zone in response to the zone having insufficient space. In another example, allocating the storage unit can involve determining the file system data includes different types of data and a first portion of the file system data can include file data and a second portion of the file system data can include file metadata. The host system can select different zones based on the different types of data and a first zone can be for data of a file and a second zone can be for metadata of the file. In either example, the storage unit can be the same or similar to a block group or extent of the file system and can be a contiguous group of blocks of the memory device that store a portion of a file system object (e.g., file).

At operation 450, the processing device of the host system can provide a location of the storage unit to the memory sub-system to store the file system data on the memory device. In one example, multiple storage units in non-adjacent zones can have been allocated and providing the location can involve providing a location of each of the multiple storage units to a controller of the memory sub-system to stripe the file system data across the non-adjacent zones. In another example, multiple storage units in zones of different memory devices can have been allocated and providing the location can involve providing locations of the multiple storage units to a controller of the memory sub-system to stripe the file system data across the zones of the different memory devices.

Figure 5:
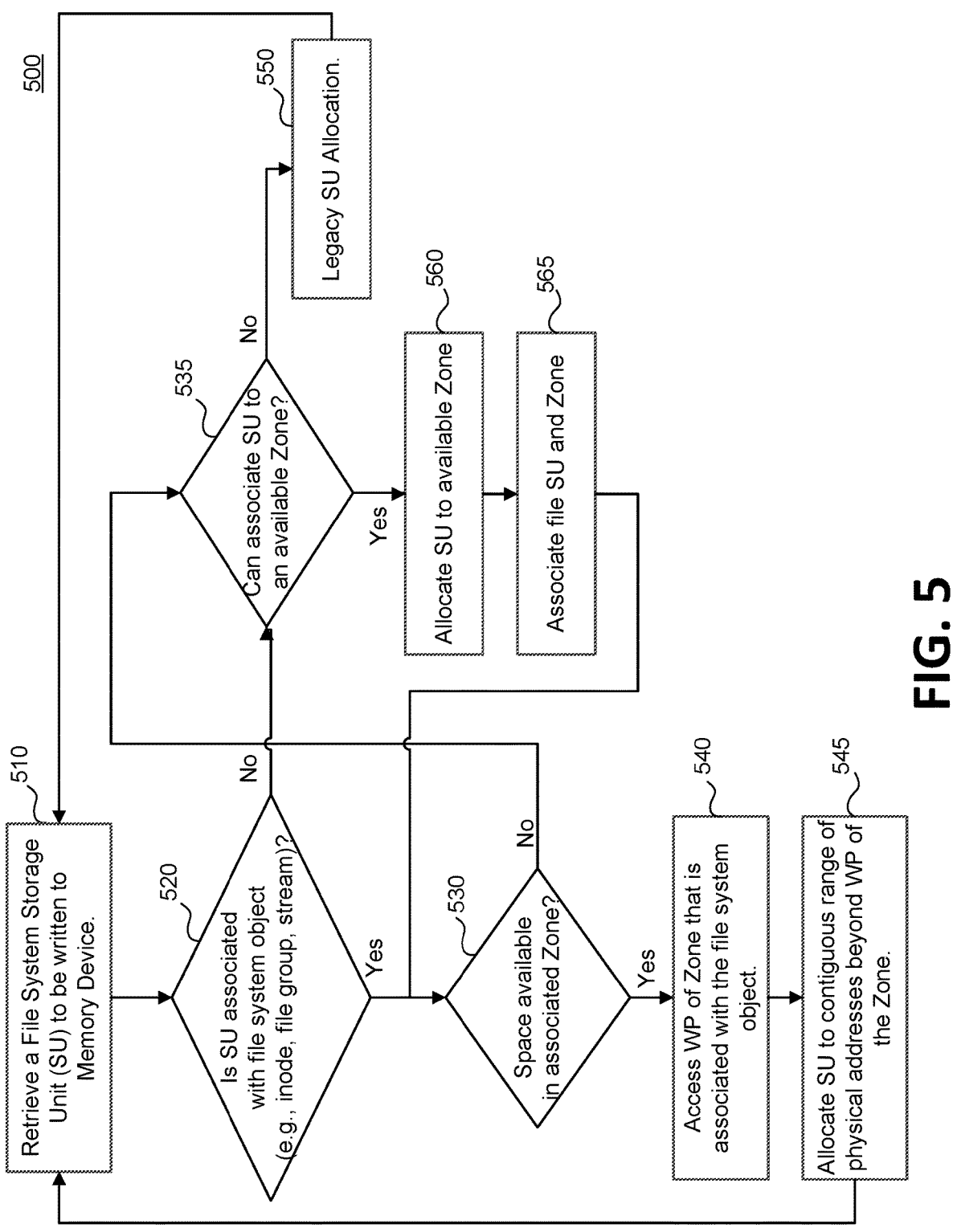
FIG. 5 is another flow chart of a method for file system storage allocation based on zones of a memory device, in accordance with some embodiments of the present disclosure.
Figure 6:
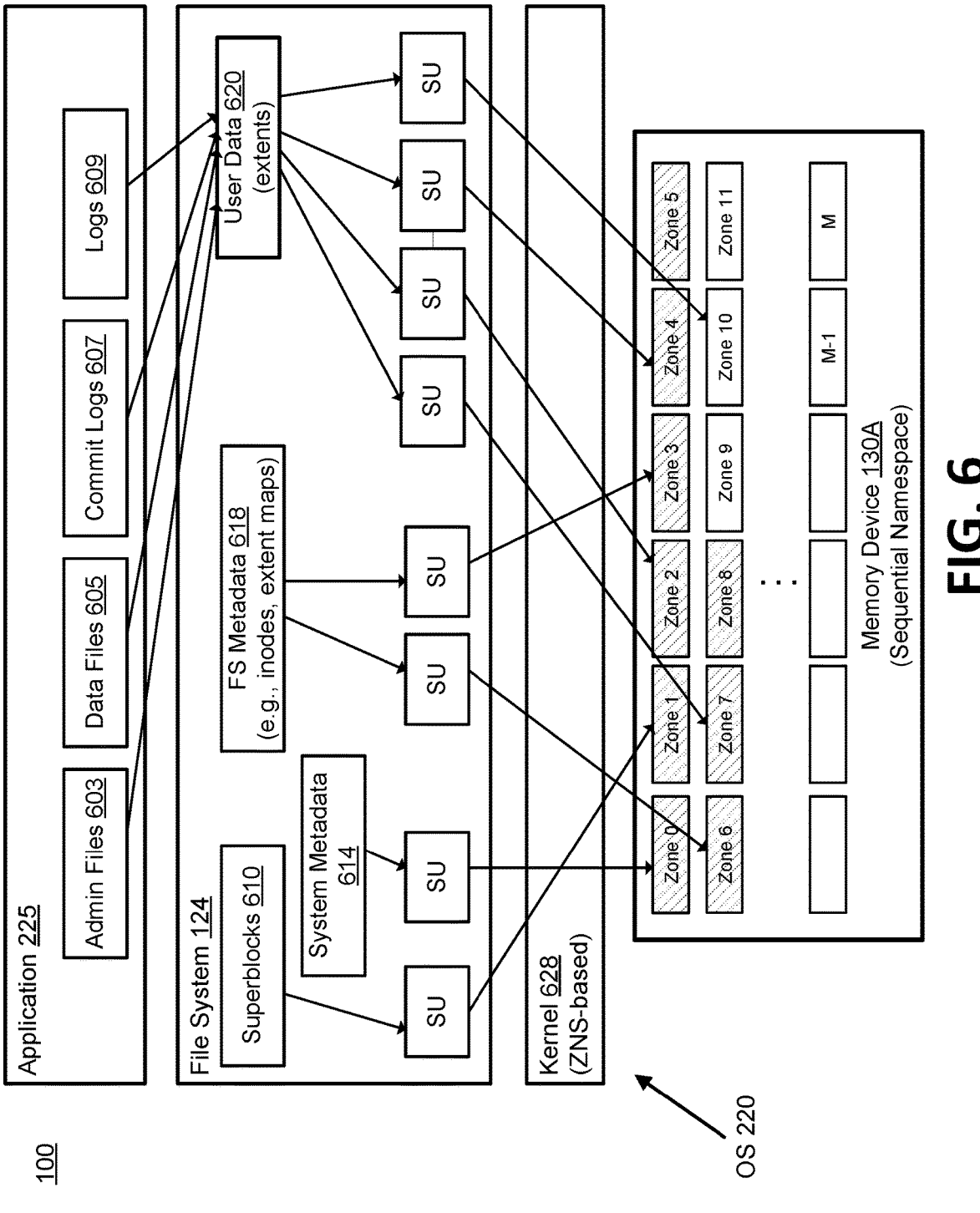
FIG. 6 is a schematic diagram that illustrates a computing system including host file system association of stream identifiers (IDs) with data types and of the stream IDs with particular zones, in accordance with some embodiments of the present disclosure.

FIGS. 5-6 provide examples of a file system that allocates and writes file system storage units (e.g., block groups) to zones of one or more memory devices. FIG. 5 is a flow chart of a method 500 for allocation of a storage unit, which is a contiguous portion of a file system object, to a group of memory cells (or a zone) according to some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the host system 120 (e.g., via execution of file system 124) of FIGS. 1-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic retrieves a storage unit (SU) to be written to a memory device. This can involve writing to one or more integrated circuits (IC) die of a memory device (e.g., memory device 130A-Z). The storage unit can be the same or similar to a block group and can be a contiguous portion of a file system object (e.g., file) that is to be written to the memory device.

At operation 520, the processing logic decides whether a storage unit is associated with a file system objet (e.g., inode, file group, stream). To do so, the processing logic can access metadata associated with the storage unit (e.g., block group metadata) to determine an identifier of the file system object (e.g., stream identifier) associated with the storage unit.

At operation 530, the processing logic determines responsive to retrieving the file system object identifier (e.g., stream ID), whether there is space available in a zone associate with the file system object. If there is space, at operation 540, the processing logic accesses, within the storage unit metadata, a write pointer associated with the zone associated with the file system unit. Further, at operation 545, the processing logic allocates, within the zone, a contiguous range of physical addresses beyond the write pointer to which to sequentially write the storage unit. The processing logic can further generate an input-output (IO) write request that will cause the storage unit to be sequentially written to the contiguous range of physical addresses in the zone, starting at the write pointer.

In some embodiments, the processing logic can associate the storage unit with the zone, the zone with the storage unit, or a combination thereof. This can involve a direct association or an indirect association. A direct association can add zone identification data to the storage unit or add storage unit identification data to the zone. An indirect association can add identification data of the file system object to the metadata of storage unit, zone, or a combination thereof.

Back at operation 520, in response to the storage unit of not being associated with an existing file system object (e.g., metadata contained no stream ID), or back at operation 530, in response to there not being space available in the zone, the processing logic transitions to operation 535. At operation 535, the processing logic determines whether there is an available zone that has sufficient storage space. If there is not, at operation 550, the processing logic performs legacy storage unit allocation (e.g., traditional block group allocation), to include garbage collection, block fragmentation, random writes, and the like.

If, at operation 535, there is an available second group of memory cells with space for storage unit allocation, the processing logic, at operation 560, allocates the storage space for the storage unit in the available zone. At operation 565, the processing logic associates identification data for the available zone to the storage unit.

The method 500 can then loop back to operation 530, where the processing logic determines that there is space available in the available zone (e.g., second zone). At operation 540, the processing logic accesses, within the storage unit metadata, a second write pointer associated with the second zone. And, at operation 545, the processing logic allocates, within the second zone, a contiguous range of physical addresses beyond the second write pointer to which to sequentially write the block group.

The method 500 can loop back to operation 510, where the processing logic retrieves a second storage unit to be written to the IC dice of the memory device, the second storage unit being associated with a second file system object (e.g., file). In one embodiment, at operation 520, the processing logic accesses storage unit metadata associated with the second storage unit to determine that the second storage unit has not been assigned to a zone, causing the processing logic to again transition to operation 535. At operation 535, the processing logic determines there is a second zone that is available for new allocations. At operation 560, the processing logic allocates the second storage unit to the second zone. At operation 565, the processing logic assigns a file system object identifier (e.g., stream ID) that is associated with the second zone to the second storage unit.

The method 500 can loop back to operation 530 again, at which the processing logic determines that there is allocable space available in the second zone. At operation 540, the processing logic accesses, within the storage unit metadata associated with the second storage unit, a second write pointer associated with the second zone. At operation 545, the processing logic allocates, within the second zone, a contiguous range of physical addresses beyond the second write pointer to which to sequentially write the second storage unit.

FIG. 6 is a schematic diagram that illustrates a computing system 600 including host file system association of stream identifiers (IDs) with data types and of the stream IDs with particular zones (or groups of memory cells) according to various embodiments. In various embodiment, the computing system 600 includes a file system 124, at least one application 225, and a kernel 628 of an operating system 220, which are executable by a processing device such as the processing device 221 (FIG. 2). The computing system 100 can further include a memory device 130A, which can be a non-volatile memory device having multiple IC dice similar to the memory device 130A (FIG. 2).

For purposes of explanation, the application 225 is a database (such as Cassandra™) or similar software application that is based on LSM architecture. Thus, in this embodiment, the application 225 handles files of a number of different data types, including, for example, administration files 603, data files 605, commit logs 607, and system logs 609. The commit logs 607 can be a record of transactions performed by the database application.

In some embodiments, the file system 124 can manage and perform allocation for a number of data types, including but not limited to, superblocks 610 of data and system metadata 615 (generated by the operating system 220, file system (FS) metadata 618 (such as inodes, tree roots, extent maps, and the like), and user data 620, which in this example are different types of extents. The files generated by the application 225 can be associated with the user data 620.

As illustrated in FIG. 2, the file system 124 can partition the files of each data type into a different storage unit (e.g., block group) or series of storage units (e.g., series of block groups), and can allocate each storage unit to a different zone (e.g., group of memory cells) in the memory device 130A, creating a stream of data (or metadata) for each data type that is separately written to the assigned zone as a group. The stream ID can be assigned to each storage unit and to the zone to which the storage unit(s) are allocated. The partitioned files can also be associated with the same stream ID, e.g., through tagging the file in some way with the stream ID. In this way, mapping between storage units and zones is transitive and straight-forward, and sequentially writing to the zones can be striped across the IC dice according to the storage units (or files), creating performance-enhancing load balancing. Simultaneously, because each storage unit is of the same data type, the data written to each zone are of the same type (or from the same application and thus has data locality), has a similar life span, and are likely to be modified at about the same rate for purposes of efficient garbage collection.

While files/storage units of the superblocks 610, the system metadata 614, inodes (of the FS metadata 618), and extent maps (of the FS metadata 618) can each be assigned to a separate stream (e.g., a different stream ID), files/storage units of the user data 620 can include multiple data types that can be separately assigned to a different stream ID. Table 1 illustrates possible stream ID assignments to different types of user data 620 associated with the application 225 in different embodiments.

TABLE 1

| Data Type | Stream ID |
| --- | --- |
| Admin Files | 0 |
| Commit Logs | 1 |
| System Logs | 2 |
| Data Directory Groups | Based on LSM ID, e.g., 3+ |

Each LSM ID can be associated with a different data directory, and thus assigned a separate stream ID. Additional types of stream ID assignments to different data types is envisioned.

In various embodiments, the file system 124 generates IO write requests to the allocated contiguous range of physical addresses beyond the current WP. In some embodiments, the kernel 628, using the device mapping logic 228, can intercept and direct these IO write requests to be sequentially written to the proper zone, beginning at the current zone WP, else handle the IO write request as a non-sequential write request. In other embodiments, the device mapping logic 228 is integrated within the file system 124, which can directly manage device mapping to proper zones.

Once a zone becomes fully written, e.g., there is no more space for further sequential IO writes, the file system 124 can allocate space in a different zone to which files/storage units of a particular data type can continue to be sequentially written. Assume the zone that becomes full was assigned a first stream ID (e.g., stream ID_0) and first files/storage units were being allocated to the zone with the first stream ID. In response to a group of memory cells becoming fully written, the file system 124 can allocate a second group of memory cells (the new zone) of the IC dice to the files/storage units. The file system 124 can further assign, to the first files/storage units, a second stream that was assigned to the new (e.g., second) zone. The file system 124 can further cause, based on the second stream ID, additional ones of the files/storage units to be sequentially written to the second group of memory cells.

Figure 7:
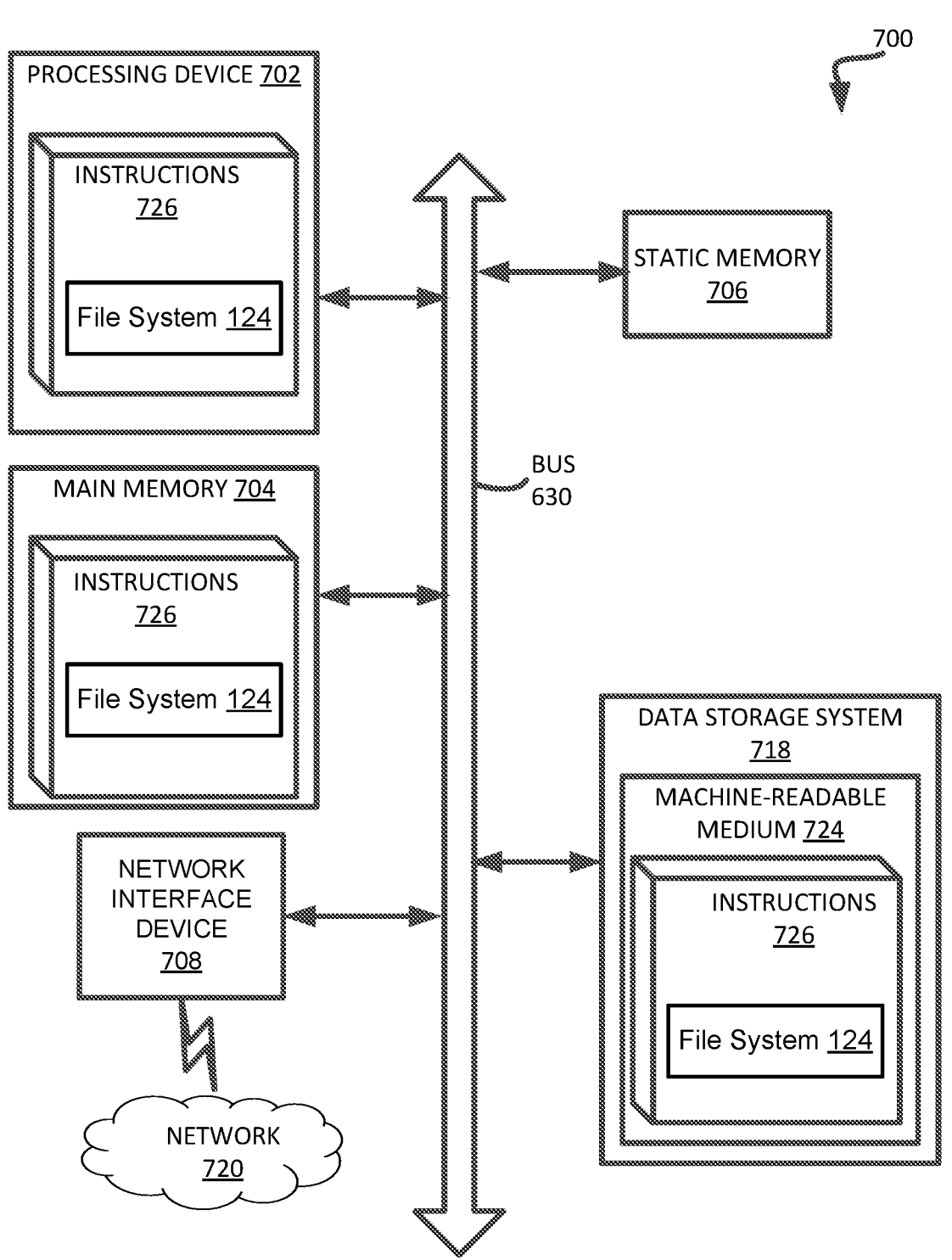
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIGS. 1-2) that includes, is coupled to, or utilizes a memory sub-system (e.g., memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the file system 124 of FIGS. 1-2. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving, by a host system, zone characteristic data from a memory sub-system comprising a memory device, wherein the memory device comprises a plurality of zones and wherein the zone characteristic data indicates physical characteristics, logical characteristics, and virtual characteristics of the plurality of zones;

identifying, by the host system, a write request that comprises file system data for a file system;

analyzing the zone characteristic data to identify a zone of the plurality of zones to store the file system data;

aggregating available storage spaces of one or more portions of the zone of the plurality of zones;

determining that the aggregated available storage spaces are equal to or greater than a block group size;

allocating, by the host system, based on the zone characteristic data and the file system data, a block group of the block group size in the zone of the plurality of zones, wherein the zone comprises a plurality of block groups, wherein the allocated block group comprises a contiguous area reserved for the file system data of the file system and is associated with a block group identifier; and providing, by the host system, a physical address of the block group to the memory sub-system, wherein the physical address references a location of the file system data in the block group.

2. The method of claim 1, wherein the memory sub-system comprises a Solid State Drive (SSD) and wherein the plurality of zones comprise Zoned Namespaces (ZNS).

3. The method of claim 1, wherein the file system comprises a copy on write (COW) file system that copies file data before modifying the file data, wherein the copy on write file system comprises a B-Tree File System (BTRFS).

4. The method of claim 1, wherein the block group comprises one or more extents of the file system, wherein the one or more extents comprise a contiguous group of blocks of the memory device that store a portion of a file.

5. The method of claim 1, wherein allocating the block group based on the zone characteristic data comprises:

determining, by the host system, that the zone of the memory device has sufficient space for the block group, wherein the determining is based on a write pointer of the zone and an end location of the zone; and responsive to the zone having sufficient space, allocating the block group in the zone.

6. The method of claim 1, wherein the file system data comprises data of a new file, and wherein allocating the block group comprises:

determining the file system data comprises different data types, wherein a first portion of the file system data comprises file data and a second portion of the file system data comprises file metadata;

selecting different zones based on the different types of data, wherein a first zone is for data of a file and a second zone is for metadata of the file; and writing, by the host system, the file data to the first zone and the file metadata to the second zone.

7. The method of claim 1, wherein the write request comprises a plurality of write requests with changes to different portions of a superblock of the file system, and further comprising, determining, by the host system, that the superblock is associated with the zone;

making a copy in main memory of all data in the zone;

updating, by the host system, the copy to reflect the changes of the plurality of write requests;

erasing all the data in the zone from the memory device; and initiating, by the host system, a single sequential write of the updated copy in main memory to the zone of the memory device.

8. The method of claim 1, wherein receiving the zone characteristic data comprises the host system receiving the zone characteristic data from a controller of the memory sub-system, the zone characteristic data indicating a size, a write pointer, and a state of each of the plurality of zones.

9. The method of claim 1, wherein the zone characteristic data sent from the memory sub-system to the host system comprises garbage collection data and one or more physical memory locations on the memory device.

10. The method of claim 1, wherein allocating the block group based on the zone characteristic data comprises allocating multiple block groups in non-adjacent zones and wherein providing the physical address comprises providing the physical address of each of the multiple block groups to a controller of the memory sub-system to stripe the file system data across the non-adjacent zones.

11. The method of claim 1, wherein allocating the block group based on the zone characteristic data comprises allocating multiple block groups in zones of different memory devices and wherein providing the physical address comprises providing physical addresses of the multiple block groups to a controller of the memory sub-system to stripe the file system data across the zones of the different memory devices.

12. A system comprising:

a memory; and a processing device, operatively coupled with the memory, to perform operations comprising:

receiving zone characteristic data from a memory sub-system comprising a memory device, wherein the memory device comprises a plurality of zones and wherein the zone characteristic data indicates physical characteristics, logical characteristics, and virtual characteristics of the plurality of zones;

identifying a write request that comprises file system data for a file system;

analyzing the zone characteristic data to identify a zone of the plurality of zones to store the file system data;

aggregating available storage spaces of one or more portions of the zone of the plurality of zones;

determining that the aggregated available storage spaces are equal to or greater than a block group size;

allocating, based on the zone characteristic data and the file system data, a block group of the block group size in the zone of the plurality of zones, wherein the zone comprises a plurality of block groups, wherein the allocated block group comprises a contiguous area reserved for the file system data of the file system and is associated with a block group identifier; and providing a physical address of the block group to the memory sub-system, wherein the physical address references a location of the file system data in the block group.

13. The system of claim 12, wherein each zone of the plurality of zones accepts sequential write operations from the system, wherein a first zone is associated with a first process executing on the system, and wherein a second zone is associated with a second process executing on the system.

14. The system of claim 12, wherein the processing device is a controller of a Solid State Drive (SSD) and wherein the plurality of zones comprise Zoned Namespaces (ZNS).

15. The system of claim 12, wherein the file system comprises a copy on write (COW) file system that copies file data before modifying the file data, wherein the copy on write file system comprises a B-Tree File System (BTRFS).

16. The system of claim 12, wherein the block group comprises one or more extents of the file system, wherein the one or more extents comprise a contiguous group of blocks of the memory device that store a portion of a file.

17. A non-transitory computer-readable medium storing instructions, which when executed by a processing device, cause the processing device to perform operations comprising:

receiving zone characteristic data from a memory sub-system comprising a memory device, wherein the memory device comprises a plurality of zones and wherein the zone characteristic data indicates physical characteristics, logical characteristics, and virtual characteristics of the plurality of zones;

identifying a write request that comprises file system data for a file system;

analyzing the zone characteristic data to identify a zone of the plurality of zones to store the file system data;

aggregating available storage spaces of one or more portions of the zone of the plurality of zones;

determining that the aggregated available storage spaces are equal to or greater than a block group size;

allocating a block group of the block group size in the zone of the plurality of zones based on the zone characteristic data and the file system data, the zone comprising a plurality of block groups, wherein the allocated block group comprises a contiguous area reserved for the file system data of the file system and is associated with a block group identifier; and providing a physical address of the block group to the memory sub-system, wherein the physical address references a location of the file system data in the block group.

18. The non-transitory computer-readable medium of claim 17, wherein the memory sub-system comprises a Solid State Drive (SSD) and wherein the plurality of zones comprise Zoned Namespaces (ZNS).

19. The non-transitory computer-readable medium of claim 17, wherein the file system comprises a copy on write (COW) file system that copies file data before modifying the file data, wherein the copy on write file system comprises a B-Tree File System (BTRFS).

20. The non-transitory computer-readable medium of claim 17, wherein the block group comprises one or more extents of the file system, wherein the one or more extents comprise a contiguous group of blocks of the memory device that store a portion of a file.

* * * * *